US009550351B2

United States Patent
Ni et al.

(10) Patent No.: US 9,550,351 B2
(45) Date of Patent: Jan. 24, 2017

(54) CORNER PEELING DEVICE, FILM PEELING APPARATUS AND FILM PEELING METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Shuang Ni, Beijing (CN); Shichu Zhang, Beijing (CN); Ziran Wang, Beijing (CN); Bin Chang, Beijing (CN); Zhenshan Lu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/743,068

(22) Filed: Jun. 18, 2015

(65) Prior Publication Data

US 2016/0193822 A1 Jul. 7, 2016

(30) Foreign Application Priority Data

Jan. 4, 2015 (CN) .......................... 2015 1 0002297

(51) Int. Cl.
   *B32B 38/10* (2006.01)
   *B32B 43/00* (2006.01)
   *B32B 38/00* (2006.01)

(52) U.S. Cl.
   CPC .......... *B32B 43/006* (2013.01); *B32B 38/105* (2013.01); *B32B 38/10* (2013.01);
   (Continued)

(58) Field of Classification Search
   CPC .. B32B 38/10; B32B 43/006; Y10T 156/1132; Y10T 156/1174; Y10T 156/1944; Y10T 156/195; Y10T 156/1978; Y10T 156/1989
   (Continued)

(56) References Cited

U.S. PATENT DOCUMENTS 1,888,194 A * 11/1932 Broadmeyer ........ B65H 3/0891
                                                    271/108
3,187,409 A * 6/1965 Glass .................... B65H 27/00
                                                    226/191
(Continued)

FOREIGN PATENT DOCUMENTS

CN    102112316       6/2011
CN    102668020 A     9/2012

OTHER PUBLICATIONS

First Chinese Office Action (including English translation) dated Nov. 23, 2016, for corresponding Chinese Application No. 201510002297.X.

*Primary Examiner* — Mark A Osele
*Assistant Examiner* — Nickolas Harm
(74) *Attorney, Agent, or Firm* — Kinney & Lange, P.A.

(57) ABSTRACT

This invention discloses a corner peeling device, a film peeling apparatus, and a film peeling method, and relates to the technical field of liquid crystal panel manufacture, for the purpose of solving the problem concerning low efficiency in film peeling. The corner peeling device comprises: a movable rack; a roller pivoted on the upper part of the rack; an evacuating device in communication with the air channel; and an automatic revolving device, which is connected to the roller so that at the beginning of corner peeling and after corner peeling, the opening of the same sucking hole at one end of the plurality of sucking holes arranged at intervals is upward. The corner peeling device is used for peeling a corner of a release film adhered to a plate-like substrate. The (Continued)

film peeling apparatus comprises the corner peeling device mentioned in the technical solution described above.

11 Claims, 4 Drawing Sheets

(52) U.S. Cl.
CPC .... *B32B 2457/202* (2013.01); *Y10T 156/1132* (2015.01); *Y10T 156/1174* (2015.01); *Y10T 156/195* (2015.01); *Y10T 156/1944* (2015.01); *Y10T 156/1978* (2015.01); *Y10T 156/1989* (2015.01)

(58) Field of Classification Search
USPC ................ 156/707, 715, 758, 759, 764, 766
See application file for complete search history.

(56) References Cited

U.S. PATENT DOCUMENTS

| | | | | |
|---|---|---|---|---|
| 5,104,473 | A * | 4/1992 | Tveit | B26D 3/282 156/268 |
| 5,277,731 | A * | 1/1994 | Krimsky | B65H 19/102 156/157 |
| 5,746,891 | A * | 5/1998 | Withers | F16J 15/064 162/369 |
| 2009/0288760 | A1* | 11/2009 | Garben | B41J 29/38 156/230 |
| 2009/0312168 | A1* | 12/2009 | Ruotsi | D21F 3/08 492/56 |
| 2012/0090763 | A1* | 4/2012 | Okuno | H01L 21/67132 156/64 |
| 2012/0154795 | A1* | 6/2012 | Kobayashi | B65H 1/14 356/213 |
| 2012/0227909 | A1* | 9/2012 | Schindler | H01L 21/67132 156/707 |
| 2014/0305591 | A1* | 10/2014 | Ahn | H01L 51/56 156/379.8 |

* cited by examiner

CORNER PEELING DEVICE, FILM PEELING APPARATUS AND FILM PEELING METHOD

FIELD OF THE INVENTION

This invention relates to the technical field of liquid crystal panel manufacture, and particularly to a corner peeling device, a film peeling apparatus, and a film peeling method.

BACKGROUND OF THE INVENTION

In the process of manufacturing liquid crystal panels, before adhering a polarizing plate to a substrate of a liquid crystal panel, it is demand that a release film on a polarizing plate is removed and then the polarizing plate whose release film has been removed is adhered to the substrate of the liquid crystal panel.

At present, methods of manual ripping are commonly used to remove release films on polarizing plates. In particular, a corner of a release film is first peeled away, and then V-shaped ripping is performed to allow the entire release film to be separated from a polarizing plate. However, due to the relatively thin thickness of the polarizing plate and the release film, it is caused that it is difficult to peel the corner of the release film, thereby resulting in the relatively low efficiency in film peeling.

SUMMARY OF THE INVENTION

An object of the present invention is to provide a corner peeling device for improving the efficiency in film peeling.

In order to achieve the object described above as well as other objects, embodiments of this invention provide the following technical solutions:

a corner peeling device, comprising:

a movable rack;

a roller pivoted on the upper part of the rack, wherein the roller is provided with an air channel as well as a plurality of sucking holes in respective communication with the air channel and the outer circumferential surface of the roller therein, and wherein openings of the plurality of the sucking holes are arranged at intervals along the circumferential direction of the roller;

an evacuating device in communication with the air channel; and an automatic revolving device, which is connected to the roller so that at the beginning of corner peeling and after corner peeling, the opening of the same sucking hole at one end of the plurality of the sucking holes arranged at intervals is upward.

Preferably, the movable rack may move horizontally and move vertically.

Preferably, from the end where the sucking hole whose opening is upward at the beginning of corner peeling and after corner peeling is positioned, to the other end, the sizes of the openings of the plurality of the sucking holes increase in turn.

Preferably, the openings of the plurality of the sucking holes are arranged at intervals on less than or equal to a quarter of the outer circumferential surface of the roller.

Preferably, the number of the air channels is plural, each of the air channels is in communication with one corresponding sucking hole of the plurality of the sucking holes, and each of the air channels is in respective communication with the evacuating device via an electromagnetic valve.

Preferably, the roller is a rubber roller or a metal roller which is annularly provided with a rubber layer on the outer circumferential surface.

Preferably, the automatic revolving device comprises a torsion spring, which has one end in fixed connection with one end of the roller and the other end in fixed connection with the rack.

Furthermore, the corner peeling device further comprises: a first driving device which is connected to the rack to allow horizontal movement and vertical movement of the rack; and a first controlling device which is in signal connection with the first driving device to control the horizontal movement and vertical movement of the rack via the first driving device, wherein the first controlling device is further in signal connection with the evacuating device to control the start, shut off, and evacuating degree of the evacuating device.

With respect to the prior art, the corner peeling device according to the invention has the following advantages:

In the corner peeling device provided by embodiments of the invention, since a roller provided with a plurality of sucking holes and an evacuating device are employed in cooperation with an automatic revolving device, the corner of the release film may be conveniently and quickly peeled using adhesion of sucking holes to the release film when the corner peeling device described above is used to peel a corner of a release film, and it is convenient for the subsequent manual film ripping or mechanical film ripping. Therefore, as compare with the circumstances where corner peeling is difficult in the prior art, the corner peeling device provided by the invention can easily peel the corner of the release film, and thereby improves the efficiency in film peeling.

Another object of the present invention is to provide a film peeling apparatus for improving the efficiency in film peeling.

In order to achieve the object described above as well as other objects, embodiments of this invention provide the following technical solutions:

a film peeling apparatus comprising the corner peeling device according to the above technical solution and a film ripping device beside the corner peeling device, wherein, the film ripping device comprises: a base; a second driving device which is connected to the base to allow horizontal movement of the base; a fixed clamp plate which is fix-mounted on the base; a movable clamp plate which is skid-mounted on the base and is disposed opposite to the fixed clamp plate; a third driving device which is connected to the movable clamp plate to drive the movable clamp plate to move toward or backward the fixed clamp plate; a sensor which is used for detecting whether there is a release film from a peeled corner between the fixed clamp plate and the movable clamp plate; and a second controlling device which is in signal connection with the second driving device, the sensor, and the third driving device respectively, wherein when the sensor detects that there is a release film from a peeled corner between the fixed clamp plate and the movable clamp plate, the second controlling device controls the movable clamp plate via the third driving device to move toward the fixed clamp plate to clamp the release film, and after the fixed clamp plate and the movable clamp plate clamp the release film, the second controlling device controls the base via the second driving device to perform horizontal movement to peel the release film off a plate-like substrate.

Preferably, the first controlling device and the second controlling device are integrated in an identical controller.

With respect to the prior art, the film peeling apparatus according to the invention has the following advantages:

In the film peeling apparatus provided by embodiments of the invention, since a corner peeling device which can quickly peel a corner of a release film and a film ripping device used in cooperation with the corner peeling device are employed, the release film may be quickly peeled off a plate-like substrate using the film ripping device after the corner peeling device peels the corner of the release film. Therefore, as compare with the circumstances of low efficiency in film peeling in the prior art, the film peeling apparatus provided by the invention can conveniently and quickly peel the release film off the plate-like substrate, and thereby improves the efficiency in film peeling.

Another object of the present invention is to provide a film peeling method using the film peeling apparatus described above for improving the efficiency in film peeling.

In order to achieve the object described above as well as other objects, embodiments of this invention provide the following technical solutions:

a film peeling method using the film peeling apparatus described above, comprising:

positioning the film peeling apparatus below the plate-like substrate having a release film to be peeled, bringing a sucking hole, which is positioned at one end and whose opening is upward at the beginning of corner peeling and after corner peeling under the action of the automatic revolving device, into contact with a corner of the release film to adhere the corner of the release film;

horizontally moving the rack and peeling the corner of the release film by using the sucking hole positioned at one end while the roller automatically rotates; and as the roller automatically rotates, bringing the remaining sucking holes into contact with the release film to adhere the release film so as to further peel the corner of the release film; and when the sensor detects that there is a release film from a peeled corner between the fixed clamp plate and the movable clamp plate, the evacuating device is shut off, the rack is downward moved to separate the roller from the release film, the second controlling device controls the movable clamp plate via the third driving device to move toward the fixed clamp plate to clamp the release film, and after the fixed clamp plate and the movable clamp plate clamp the release film, the second controlling device controls the base via the second driving device to perform horizontal movement to peel the release film off the plate-like substrate.

Since the film peeling method and the film peeling apparatus described above have many of the same advantages with respect to the prior art, redundant description is omitted.

BRIEF DESCRIPTION OF THE DRAWINGS

Figures illustrated herein are used for providing further understandings of the invention and constitute a part of the invention. Schematic embodiments of the invention and illustrations thereof are used for explaining the invention, and do not constitute improper definition of the invention. In the drawings.

REFERENCE NUMBERS

| | |
|---|---|
| 10-corner peeling device, | 11-rack, |
| 12-roller, | 13-sucking hole, |
| 14-automatic revolving device, | 20-film ripping device, |
| 21-fixed clamp plate, | 22-movable clamp plate, |
| 30-polarizing plate, | 31-release film. |

DETAILED DESCRIPTION OF THE INVENTION

In order to further illustrate the corner peeling device, the film peeling apparatus, and the film peeling method provided by the examples of the invention, detailed descriptions will be made in conjunction with figures in the following.

It is to be indicated that the corner peeling device, the film peeling apparatus, and the film peeling method of embodiments of the invention are suitable for peeling release films adhered to different plate-like substrates, for example, release films adhered to polarizing plates, release films adhered to substrates, and release films adhered to display panels. Hereafter, for the purpose of convenient description, the illustration is made by exemplifying the peeling of a release film adhered to a polarizing plate.

Figure 1:
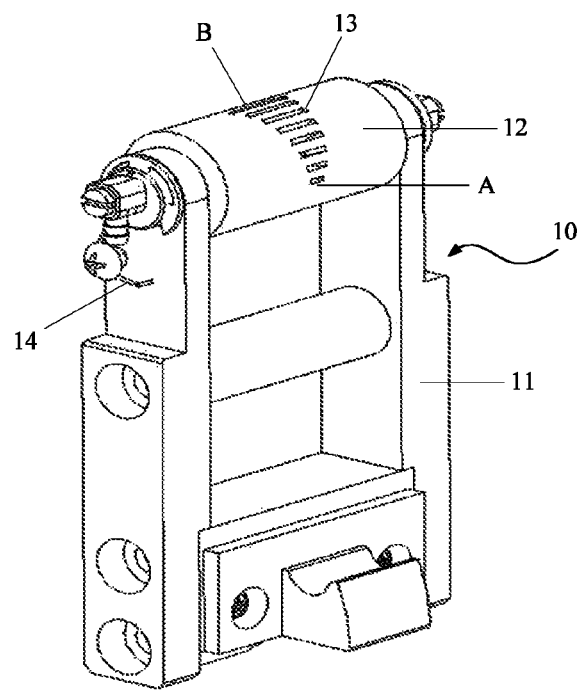
FIG. 1 is a perspective view of the corner peeling device in one example of the invention.
Figure 2:
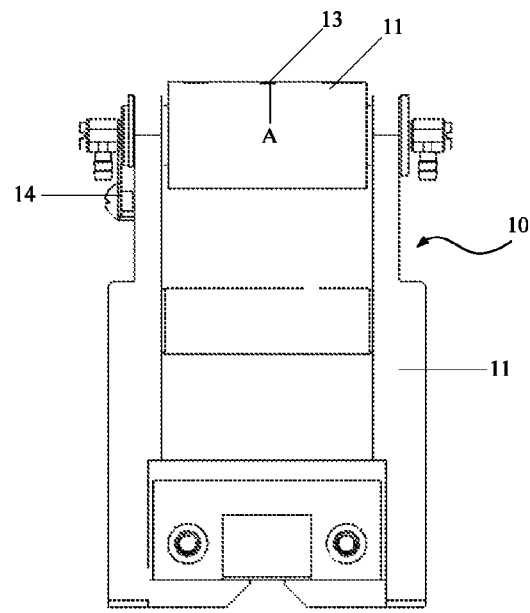
FIG. 2 is a front view of the corner peeling device in FIG. 1.
Figure 3:
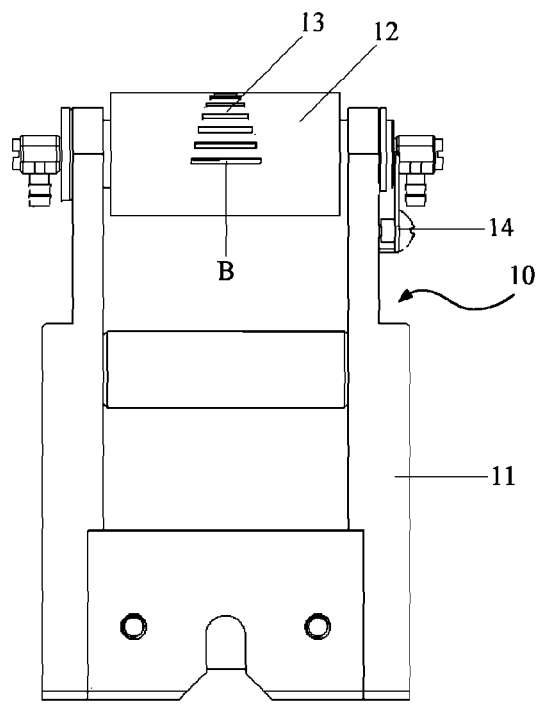
FIG. 3 is a back view of the corner peeling device in FIG. 1.

With reference to FIGS. 1, 2, and 3, a corner peeling device 10 provided by embodiments of the invention comprises: a rack 11, a roller 12, an evacuating device (not shown in the Figures) and an automatic revolving device 14, wherein the rack 11 may move horizontally and move vertically, and wherein the roller 12 is pivoted on the upper part of the rack, the roller 12 is provided with an air channel (not shown in the Figures) as well as a plurality of sucking holes 13 in respective communication with the air channel and the outer circumferential surface of the roller 12, and openings of the plurality of the sucking holes 13 are arranged at intervals along the circumferential direction of the roller 12; the evacuating device is in communication with the air channel for forming a vacuum in each of the sucking holes 13; and the automatic revolving device 14 is connected to the roller 12 so that at the beginning of corner peeling and after corner peeling, the opening of an identical sucking hole 13 at one end (end A shown in the Figures) of the plurality of the sucking holes 13 is upward.

When the corner peeling device 10 described above is employed to peel the release film adhered to the polarizing plate, the polarizing plate is horizontally placed in a corresponding positioning mechanism, and the release film adhered to the polarizing plate faces downward. The corner peeling device described above is positioned below the polarizing plate, and the opening of the sucking hole 13 at end A faces upward under the action of the automatic revolving device 14. At the beginning of corner peeling, the opening of the sucking hole 13 at end A is in contact with the corner of the release film, and adheres to the corner of the release film under the action of the evacuating device. When the rack 11 moves horizontally, the roller 12 automatically rotates. Since the suction of the sucking hole 13 is much greater than the adhesion between the release film and the polarizing plate, the corner of the release film may be peeled using the sucking hole 13 at end A. While the roller 12 rotates, the remaining sucking holes 13 contact the release film and adhere to the release film one after the other. After the rack 11 horizontally moves a certain distance, the corner of the release film is completely peeled. After the corner of the release film is completely peeled, the work of the evacuating device stops and the rack 11 moves downward, and at the same time, the corner of the release film is clamped manually or by other apparatuses, and thereby the release film can be peeled off the polarizing plate.

In the embodiments described above, the corner of the release film can be peeled using the plurality of the sucking holes 13 provided on the roller 12, the evacuating device, and the automatic revolving device 14, and it is convenient for subsequent manual film ripping or mechanical film ripping. As compare with the circumstances where corner peeling is difficult in the prior art, the corner peeling device 10 provided by embodiments of the invention can easily peel the corner of the release film, and thereby improves the efficiency in film peeling.

With continued reference to FIG. 1, in order to facilitate the peeling of the corner of the release film, preferably, from the end where the sucking hole 13 whose opening is upward at the beginning of corner peeling and after corner peeling is positioned, to the other end, the sizes of the openings of the plurality of the sucking holes 13 increase in turn. In particular, in the arrangement of a plurality of sucking holes 13, the sizes of the openings of the plurality of the sucking holes 13 sequentially increase from end A to end B. It is so designed that the sucking hole 13 at end A is easier to adhere the corner of the release film when peeling the release film adhered to the polarizing plate, and thereby it is convenient to peel the corner of the release film. In addition, since the sizes of the openings of the plurality of the sucking holes 13 sequentially increase from end A to end B, the contact areas between the sucking holes 13 and the release film increase therewith. The adhesion of each sucking hole 13 to the release film is so increased that the occurrence of peeling failure is prevented.

In the embodiments described above, the openings of the plurality of the sucking holes 13 are arranged at intervals on the outer circumferential surface of the roller 12. In particular, they can be annularly arranged on the outer circumferential surface of the roller 12 along the circumferential direction of the roller 12, or can be arranged on a portion of the outer circumferential surface of the roller 12 along the circumferential direction of the roller 12. Preferably, a plurality of sucking hole 13 are arranged at intervals on one half of the outer circumferential surface of the roller 12. Thereby, when peeling the corner of the release film, the release film is prevented from forming a circular arc cylinder greater than one half of the outer circumferential surface on the roller 12, and therefore it is convenient to separate the roller 12 from the release film after the corner of the release film is peeled. Furthermore, with continued reference to FIG. 1, the openings of the plurality of the sucking holes 13 are arranged at intervals on less than or equal to a quarter of the outer circumferential surface of the roller 12. It is so designed that the contact area between the release film and the region of the roller 12 except the openings of the plurality of the sucking holes 13 may be decreased, and therefore it is more convenient to separate the roller 12 from the release film after the corner of the release film is peeled.

In order to facilitate the control on the adhesion capacity of each of the sucking holes 13, the number of the air channels described above is preferably plural, and each of the air channels is in communication with corresponding one of the sucking holes 13. In particular, a plurality of air channels are provided in the roller 12 along the axial direction of the roller 12, each of the air channels is in communication with corresponding one of the sucking holes 13, and each of the air channels is in respective communication with the evacuating device via an electromagnetic valve. When peeling the release film adhered to the polarizing plate, vacuum may be formed in corresponding sucking holes 13 by turning on the electromagnetic valves in turn, the vacuum adhesion value in each sucking hole 13 is so controlled that it is convenient to control the adhesion capacity of each sucking hole 13. In addition, whether a sucking hole adheres the release film can be also determined by the vacuum adhesion value in each sucking hole 13, so that the reliability of the corner peeling device described above is improved.

In the embodiments described above, various materials may be used for manufacturing the roller 12. In order to ensure the leakproofness upon film peeling, preferably, the roller 12 is a rubber roller or a metal roller which is annularly provided with a rubber layer on the outer circumferential surface. With the feature of deformability of rubber, the outer circumferential surface of the roller 12 may be better attached to the release film on the polarizing plate upon film peeling, so that the leakproofness upon film peeling may be ensured and thereby it is convenient for adhesion and peeling of the release film.

In the embodiments described above, the function of the automatic revolving device 14 is to allow the opening of the sucking hole 13 positioned at end A to be upward at the beginning of corner peeling and after corner peeling so that it is convenient to adhere the corner of the release film. There are various structural forms of the automatic revolving device 14, and for example, the automatic revolving device 14 comprises: a connecting rod with an end connected to an end of the roller 12, and a balancing weight connected to the other end of the connecting rod. When the balancing weight is in static balance under the action of the gravity of its own, the opening of the sucking hole 13 at end A faces upward at this time. When the roller 12 rotates under the drive of the release film, the balancing weight and the connecting rod rotate therewith. After the release film is separated from the roller 12 (after breaking the adhesion between the release film and the roller), the balancing weight revolves under the action of the gravity of its own so as to enable revolution of the roller 12. When the balancing weight reaches static balance again, the opening of the sucking hole 13 at end A faces upward so as to peel the corner of the release film adhered to the next polarizing plate.

With continued reference to FIG. 1, in a preferred embodiment, the automatic revolving device 14 comprises a torsion spring, which has one end in fixed connection with one end of the roller 12 and the other end in fixed connection with the rack 11. When the roller 12 rotates, the torsion spring stores force under the action of the roller 12. When the release film is separated from the roller 12, the roller 12 revolves under the action of the counteraction provided by the torsion spring, so that the opening of the sucking hole 13 at end A faces upward.

In the embodiments described above, the horizontal movement and the vertical movement of the rack 11 may be achieved manually, or may be derived by a set driving device, and the start and shut off of the evacuating device may be controlled by respective switches. Furthermore, in order to save labor and improve the efficiency in film peeling, on the basis of the embodiments described above, the corner peeling device further comprises: a first driving device (not shown in the Figure) which is connected to the rack 11 to allow horizontal movement and vertical movement of the rack 11, and a first controlling device (not shown in the Figures) which is in signal connection with the first driving device to control horizontal movement and vertical movement of the rack 11 via the first driving device, and wherein the first controlling device is further in signal connection with the evacuating device to control start, turnoff, and evacuating degree of the evacuating device.

Figure 4:
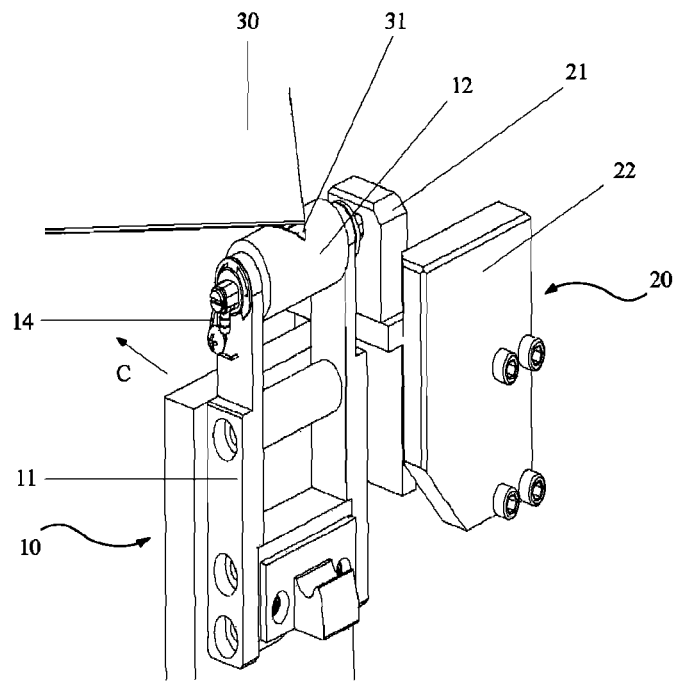
FIG. 4 is a structural schematic diagram of the film peeling apparatus in one example of the invention at the beginning of film peeling.
Figure 5:
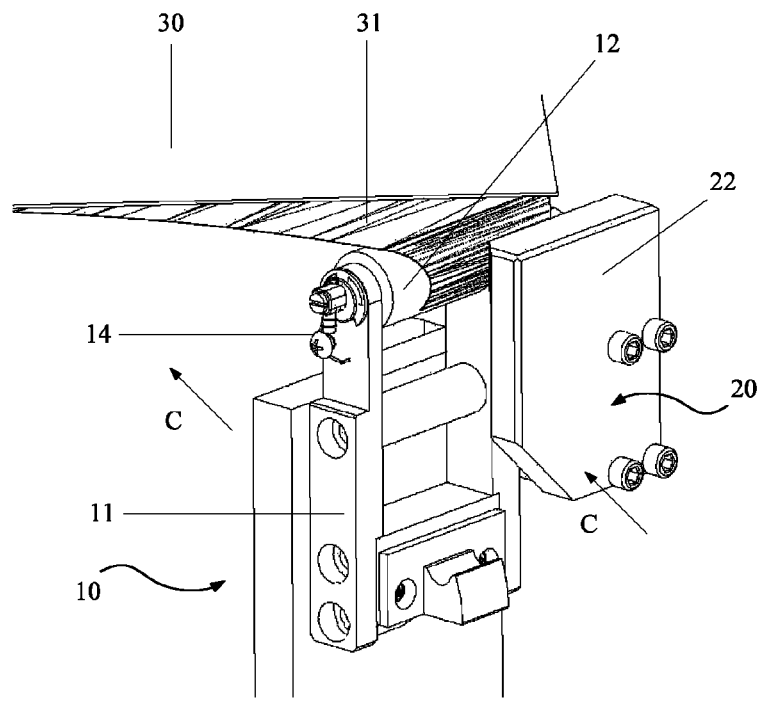
FIG. 5 is a structural schematic diagram of the film peeling apparatus in one example of the invention at the time of film peeling.
Figure 6:
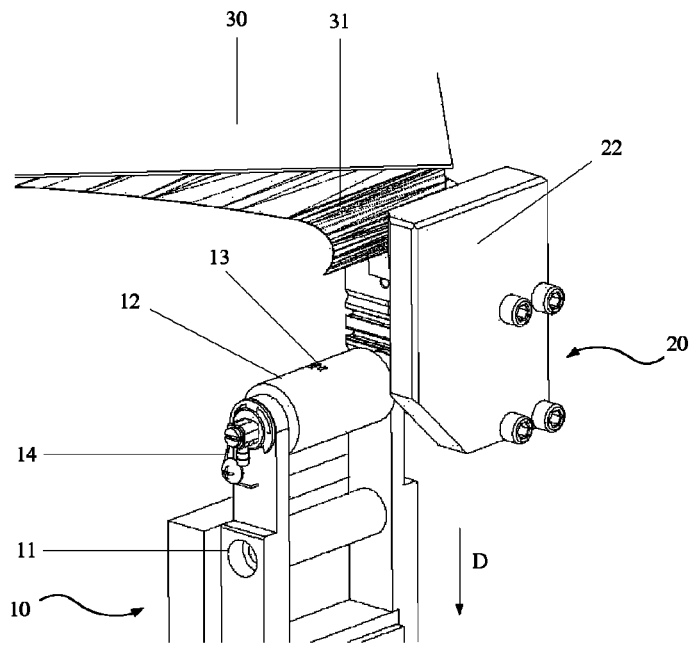
FIG. 6 is a structural schematic diagram of the film peeling apparatus in one example of the invention at the time of film clamping.
Figure 7:
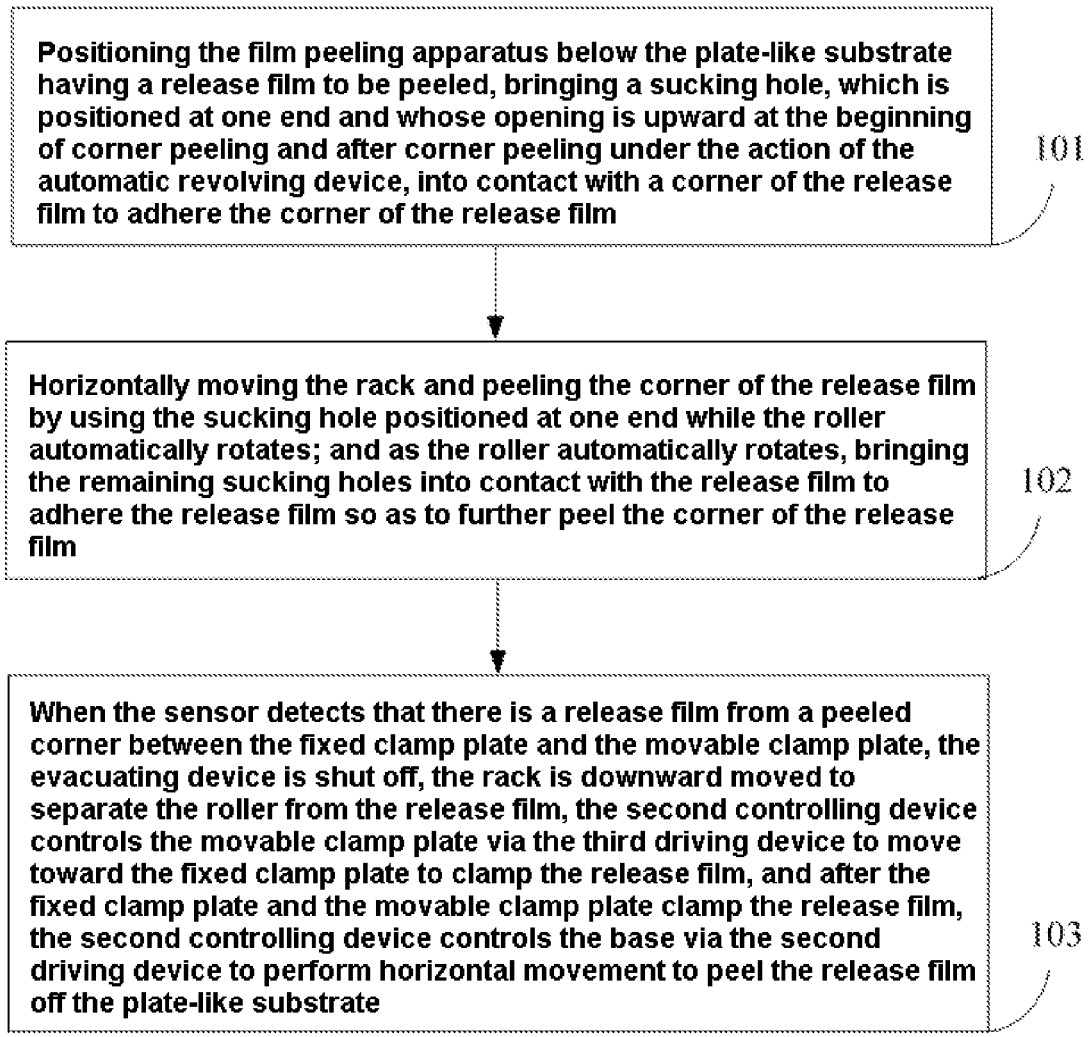
FIG. 7 is a flow chart of the film peeling method in one example of the invention.

With reference to FIGS. 4, 5, and 6, an embodiment of the invention further provides a film peeling apparatus, comprising: the corner peeling device 10 according to the above technical solution and a film ripping device 20 beside the corner peeling device 10, wherein, the film ripping device 20 comprises: a base (not shown in the Figures); a second driving device (not shown in the Figures) which is connected to the base to allow horizontal movement of the base; a fixed clamp plate 21 which is fix-mounted on the base; a movable clamp plate 22 which is skid-mounted on the base and is disposed opposite to the fixed clamp plate 21; a third driving device (not shown in the Figures) which is connected to the movable clamp plate 22 to drive the movable clamp plate 22 to move toward or backward the fixed clamp plate 21; a sensor (not shown in the Figures) which is used for detecting whether there is a release film from a peeled corner between the fixed clamp plate 21 and the movable clamp plate 22, and a second controlling device (not shown in the Figures) which is in signal connection with the second driving device, the sensor, and the third driving device respectively, wherein when the sensor detects that there is a release film from a peeled corner between the fixed clamp plate 21 and the movable clamp plate 22, the second controlling device controls the movable clamp 22 plate via the third driving device to move toward the fixed clamp plate 21 to clamp the release film, and after the fixed clamp plate 21 and the movable clamp plate 22 clamp the release film, the second controlling device controls the base via the second driving device to perform horizontal movement to peel the release film off the plate-like substrate.

When the film peeling apparatus described above is employed to peel the release film adhered to the polarizing plate, the process of peeling the corner of the release film using the corner peeling device 10 has been described, and thus redundant description is omitted herein. After the corner of the release film is gradually peeled by the corner peeling device 10, when the sensor detects that there is a release film from a peeled corner between the fixed clamp plate 21 and the movable clamp plate 22, according to the information fed back by the sensor, the second controlling device controls the movable clamp plate 22 via the third driving device to move toward the fixed clamp plate 21 to clamp the release film, and after the fixed clamp plate 21 and the movable clamp plate 22 clamp the release film, the second controlling device controls the base via the second driving device to perform horizontal movement to peel the release film off the polarizing plate. Therefore, as compare with the circumstances of relatively low efficiency in manual film peeling in the prior art, the film peeling apparatus provided by embodiments of the invention can easily peel the corner of the release film and rip the entire release film off the polarizing plate, and thereby improves the efficiency in film peeling.

It is noteworthy that the first controlling device and the second controlling device described above are integrated in an identical controller. In other words, the functions of the first controlling device and the second controlling device described above can be achieved by an identical controller. In addition, it can be seen from FIGS. 1, 2, and 3 that both the corner peeling device 10 and the film ripping device 20 move along the diagonal direction of the release film when peeling the corner of the release film by the corner peeling device 10 and peeling the release film by the film ripping device 20 so as to perform the V-shaped film peeling. In addition, it can be seen from FIGS. 4 and 5 that the corner peeling device 10 moves between the movable clamp plate 22 and the fixed clamp plate 21 so that the sensor can quickly and accurately detect that there is a release film from a peeled corner between the fixed clamp plate 21 and the movable clamp plate 22 after the corner of the release film is peeled by the corner peeling device.

With continued reference to FIGS. 4, 5, 6, and 7, an embodiment of the invention further provides a film peeling method using the film peeling apparatus described above, comprising the steps of:

Step 101: positioning the film peeling apparatus below the plate-like substrate having a release film to be peeled, bringing a sucking hole 13, which is positioned at one end and whose opening is upward at the beginning of corner peeling and after corner peeling under the action of the automatic revolving device 14, into contact with a corner of the release film 31 to adhere the corner of the release film. In particular, as shown in FIG. 4, at the beginning of film peeling, the polarizing plate 30 is positioned by a positioning mechanism, and the release film 31 adhered to the polarizing plate 30 faces downward. The film peeling apparatus is positioned below the polarizing plate 30, and the sucking hole 13 positioned at one end is in contact with and adheres the corner of the release film 31.

Step 102: horizontally moving the rack 11 and peeling the corner of the release film by using the sucking hole 13 positioned at one end while the roller 12 automatically rotates; and as the roller automatically rotates, bringing the remaining sucking holes 13 into contact with the release film to adhere the release film so as to further peel the corner of the release film. In particular, as shown in FIGS. 4 and 5, when the rack 11 moves horizontally along direction C in FIGS. 4 and 5, the roller 12 automatically rotates. Since the suction of the sucking hole 13 is much greater than the adhesion between the release film and the polarizing plate, the corner of the release film may be peeled using the sucking hole 13 at end A. While the roller 12 rotates, the remaining sucking holes 13 contact the release film and adhere to the release film in turn so as to further peel the corner of the release film.

Step 103: when the sensor detects that there is a release film from a peeled corner between the fixed clamp plate 21 and the movable clamp plate 22, the evacuating device is shut off, the rack 11 is downward moved to separate the roller 12 from the release film, the second controlling device controls the movable clamp plate 22 via the third driving device to move toward the fixed clamp plate 21 to clamp the release film, and after the fixed clamp plate 21 and the movable clamp plate 22 clamp the release film, the second controlling device controls the base via the second driving device to perform horizontal movement to peel the release film off the plate-like substrate. In particular, as shown in FIG. 6, after the corner of the release film is peeled to some extent, a part of the release film will extend to a place between the fixed clamp plate 21 and the movable clamp plate 22, and the sensor will detect that there is a release film between the fixed clamp plate 21 and the movable clamp plate 22. At this time, the evacuating device stops to break the adhesion between the roller 12 and the release film, and the rack 11 moves downward along direction D in FIG. 6 so as to separate the roller 12 from the release film. Meanwhile, when the sensor detects that there is a release film from a peeled corner between the fixed clamp plate 21 and the movable clamp plate 22, according to the information fed back by the sensor, the second controlling device controls the movable clamp 22 plate via the third driving device to move toward the fixed clamp plate 21 to clamp the release film, and after the fixed clamp plate 21 and the movable clamp plate 22 clamp the release film, the second controlling device controls the base via the second driving device to perform horizontal movement to peel the release film off the plate-like substrate.

Therefore, as compare with the circumstances of relatively low efficiency in manual film peeling in the prior art, the corner of the release film can be easily peeled and the entire release film can be ripped off the polarizing plate by using the film peeling method provided by embodiments of the invention, and thereby improves the efficiency in film peeling.

In the description of the embodiments described above, the particular characteristics, structures, materials, or features may be combined in a suitable manner in any one or more embodiments or examples.

The above described are merely particular embodiments of the invention, but the protection scope of the invention is not to be limited thereto. Within the technical scope disclosed by the invention, any person skilled in the art will easily conceive variations or substitutions, which should be covered by the protection scope of the invention. Therefore, the protection scope of the invention is determined by the protection scope of the claims.

What is claimed is:

1. A corner peeling device, comprising:
   a movable rack;
   a roller pivoted on an upper part of the rack, wherein the roller is provided with an air channel as well as a plurality of sucking holes in respective communication with the air channel and an outer circumferential surface of the roller therein, and wherein openings of the plurality of the sucking holes are arranged at intervals along a circumferential direction of the roller;
   an evacuating device in communication with the air channel; and
   an automatic revolving device, which is connected to the roller so that at the beginning of corner peeling and after corner peeling, the opening of a same sucking hole at a first end of the plurality of sucking holes arranged at intervals is upward,
   wherein from the end where the sucking hole whose opening is upward at the beginning of corner peeling and after corner peeling is positioned, to the other end, the sizes of the openings of the plurality of the sucking holes increase in turn.

2. The corner peeling device according to claim 1, wherein the openings of the plurality of the sucking holes are arranged at intervals on less than or equal to a quarter of the outer circumferential surface of the roller.

3. The corner peeling device according to claim 2, wherein the roller is provided with a plurality of air channels, each of the air channels is in communication with one corresponding sucking hole of the plurality of the sucking holes, and each of the air channels is in respective communication with the evacuating device via an electromagnetic valve.

4. The corner peeling device according to claim 3, wherein the roller is a rubber roller or a metal roller which is annularly provided with a rubber layer on the outer circumferential surface.

5. The corner peeling device according to claim 1, wherein the roller is provided with a plurality of air channels, each of the air channels is in communication with one corresponding sucking hole of the plurality of the sucking holes, and each of the air channels is in respective communication with the evacuating device via an electromagnetic valve.

6. The corner peeling device according to claim 5, wherein the roller is a rubber roller or a metal roller which is annularly provided with a rubber layer on the outer circumferential surface.

7. The corner peeling device according to claim 1, wherein the automatic revolving device comprises a torsion spring, which has a first end in fixed connection with one end of the roller and a second opposite end in fixed connection with the rack.

8. The corner peeling device according to claim 1, wherein the corner peeling device further comprises:
   a first driving device which is connected to the rack to allow horizontal movement and vertical movement of the rack; and
   a first controlling device which is in signal connection with the first driving device to control the horizontal movement and vertical movement of the rack via the first driving device, wherein the first controlling device is further in signal connection with the evacuating device to control a start, shut off, and evacuating degree of the evacuating device.

9. A film peeling apparatus comprising the corner peeling device according to claim 8 and a film ripping device beside the corner peeling device, wherein, the film ripping device comprises:
   a base;
   a second driving device which is connected to the base to allow horizontal movement of the base;
   a fixed clamp plate which is fixedly mounted on the base;
   a movable clamp plate which is skid-mounted on the base and is disposed opposite to the fixed clamp plate;
   a third driving device which is connected to the movable clamp plate to drive the movable clamp plate to move toward or backward from the fixed clamp plate;
   a sensor configured to detect whether there is a release film from a peeled corner between the fixed clamp plate and the movable clamp plate; and
   a second controlling device which is in signal connection with the second driving device, the sensor, and the third driving device respectively, wherein when the sensor detects that there is a release film from a peeled corner between the fixed clamp plate and the movable clamp plate, the second controlling device controls the movable clamp plate via the third driving device to move toward the fixed clamp plate to clamp the release film, and after the fixed clamp plate and the movable clamp plate clamp the release film, the second controlling device controls the base via the second driving device to perform horizontal movement to peel the release film off a plate-like substrate.

10. The film peeling apparatus according to claim 9, wherein the first controlling device and the second controlling device are integrated in an identical controller.

11. A film peeling method using the film peeling apparatus according to claim 9, comprising the steps of:
- positioning the film peeling apparatus below the plate-like substrate having the release film to be peeled, and bringing a sucking hole, which is positioned at the first end and whose opening is upward at the beginning of corner peeling and after corner peeling under the action of the automatic revolving device, into contact with a corner of the release film to adhere the corner of the release film;
- horizontally moving the rack and peeling the corner of the release film by using the sucking hole positioned at the first end while the roller automatically rotates, and as the roller automatically rotates, bringing the remaining sucking holes into contact with the release film to adhere the release film so as to further peel the corner of the release film; and
- when the sensor detects that there is release film from the peeled corner between the fixed clamp plate and the movable clamp plate, the evacuating device is shut off, the rack is moved downward to separate the roller from the release film, the second controlling device controls the movable clamp plate via the third driving device to move toward the fixed clamp plate to clamp the release film, and after the fixed clamp plate and the movable clamp plate clamp the release film, the second controlling device controls the base via the second driving device to perform horizontal movement to peel the release film off the plate-like substrate.

* * * * *